(12) United States Patent
Bhaduri

(10) Patent No.: US 8,628,735 B2
(45) Date of Patent: Jan. 14, 2014

(54) PROCESS FOR RECOVERING METALS FROM COAL LIQUEFACTION RESIDUE CONTAINING SPENT CATALYSTS

(75) Inventor: Rahul S. Bhaduri, Moraga, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 579 days.

(21) Appl. No.: 12/732,136

(22) Filed: Mar. 25, 2010

(65) Prior Publication Data

US 2010/0300250 A1 Dec. 2, 2010

Related U.S. Application Data

(60) Provisional application No. 61/163,331, filed on Mar. 25, 2009.

(51) Int. Cl.
*C01G 37/00* (2006.01)
*C01G 39/00* (2006.01)

(52) U.S. Cl.
USPC .................. 423/53; 423/155; 75/743

(58) Field of Classification Search
USPC .......................................................... 423/53
See application file for complete search history.

(56) References Cited

U.S. PATENT DOCUMENTS

| | | | |
|---|---|---|---|
| 2,313,940 A | 3/1943 | Hirsch et al. | |
| 2,521,757 A | 9/1950 | Smith | |
| 3,455,677 A | 7/1969 | Litz | |
| 3,763,303 A | 10/1973 | Khuri et al. | |
| 3,903,241 A | 9/1975 | Stevens et al. | |
| 4,040,958 A | 8/1977 | Rammler | |
| 4,131,455 A | 12/1978 | Edwards et al. | |
| 4,145,397 A | 3/1979 | Toida et al. | |
| 4,216,118 A | 8/1980 | Yoshida et al. | |
| 4,220,634 A | 9/1980 | Deschamps et al. | |
| 4,278,644 A * | 7/1981 | Rappas et al. | 423/58 |
| 4,374,100 A | 2/1983 | Sebenik et al. | |
| 4,409,190 A | 10/1983 | Van Leirsburg | |
| 4,411,874 A | 10/1983 | Lee | |
| 4,417,972 A | 11/1983 | Francis et al. | |
| 4,432,953 A | 2/1984 | Hubred et al. | |

(Continued)

FOREIGN PATENT DOCUMENTS

JP 060574353 3/1994
JP 6228666 8/1994

(Continued)

OTHER PUBLICATIONS

PCT Search Report and Written Opinion, Jul. 29, 2009.

*Primary Examiner* — Melvin C Mayes
*Assistant Examiner* — Melissa Stalder

(57) ABSTRACT

In one embodiment, this invention is directed to a method of recovering metals from a metals bearing material comprising: reducing the particle size of at least a portion of the metals bearing material; mixing the metals bearing material in an acid solution to form a first slurry containing at least alkaline earth metal compounds; separating the at least alkaline earth metal compounds from the first slurry to form a first filtrate and a metals bearing material; leaching metals from the metals bearing material to form a pressure leach solution containing transition metals; precipitating and recovering transition metals from the pressure leach solution. In another aspect, the invention relates to a method for recovering metals from a deoiled and dried coal liquefaction residue that contains spent catalyst originating from a Group VIB metal sulfide catalyst.

33 Claims, 1 Drawing Sheet

(56) References Cited

U.S. PATENT DOCUMENTS

| | | |
|---|---|---|
| 4,434,043 A | 2/1984 | Singhal et al. |
| 4,500,495 A | 2/1985 | Hubred et al. |
| 4,541,868 A | 9/1985 | Lowenhaupt et al. |
| 4,548,700 A | 10/1985 | Bearden, Jr. et al. |
| 4,554,138 A | 11/1985 | Marcantonio |
| 4,557,821 A | 12/1985 | Lopez et al. |
| 4,575,381 A * | 3/1986 | Corbeels et al. ............... 44/280 |
| 4,661,265 A | 4/1987 | Olson et al. |
| 4,710,486 A | 12/1987 | Lopez et al. |
| 4,732,664 A | 3/1988 | Solari Martini et al. |
| 4,762,812 A | 8/1988 | Lopez et al. |
| 4,778,605 A | 10/1988 | Anthoney et al. |
| 4,824,821 A | 4/1989 | Lopez et al. |
| 4,832,925 A | 5/1989 | Weir et al. |
| 4,857,496 A | 8/1989 | Lopez et al. |
| 4,861,565 A | 8/1989 | Sefton et al. |
| 4,900,522 A | 2/1990 | Chou et al. |
| 4,970,190 A | 11/1990 | Lopez et al. |
| 5,008,001 A | 4/1991 | Kitamura et al. |
| 5,094,991 A | 3/1992 | Lopez et al. |
| 5,099,047 A | 3/1992 | Sato et al. |
| 5,162,282 A | 11/1992 | Lopez et al. |
| 5,164,075 A | 11/1992 | Lopez |
| 5,178,749 A | 1/1993 | Lopez et al. |
| 5,246,570 A | 9/1993 | Cronauer et al. |
| 5,294,329 A | 3/1994 | Kramer |
| 5,298,152 A | 3/1994 | Kramer |
| 5,415,849 A | 5/1995 | Toyabe et al. |
| 5,420,088 A | 5/1995 | Silva et al. |
| 5,424,263 A | 6/1995 | Buehler |
| 5,457,258 A | 10/1995 | Hommeltoft et al. |
| 5,484,755 A | 1/1996 | Lopez |
| 5,505,857 A | 4/1996 | Misra et al. |
| 5,573,556 A | 11/1996 | Wen |
| 5,935,418 A | 8/1999 | Chakrabarty et al. |
| 6,153,155 A | 11/2000 | Wen et al. |
| 6,180,072 B1 | 1/2001 | Veal et al. |
| 6,511,937 B1 | 1/2003 | Bearden, Jr. et al. |
| 6,589,492 B2 | 7/2003 | Matsumoto et al. |
| 6,673,732 B2 | 1/2004 | Muhler et al. |
| 6,733,564 B1 | 5/2004 | Sahu et al. |
| 6,974,842 B1 | 12/2005 | Spena et al. |
| 7,033,480 B2 | 4/2006 | King |
| 7,067,090 B2 | 6/2006 | Han et al. |
| 7,182,926 B2 | 2/2007 | Akahoshi |
| 2003/0098262 A1 | 5/2003 | Rendall |
| 2003/0130118 A1 | 7/2003 | Koyama et al. |
| 2004/0219082 A1 | 11/2004 | Matjie et al. |
| 2004/0237720 A1 | 12/2004 | Moyes et al. |
| 2004/0241066 A1 | 12/2004 | Jasra et al. |
| 2005/0101480 A1 | 5/2005 | Ackerman et al. |
| 2005/0109674 A1 | 5/2005 | Klein |
| 2005/0118081 A1 | 6/2005 | Harris et al. |
| 2005/0249652 A1 | 11/2005 | Scharifker et al. |
| 2006/0051875 A1 | 3/2006 | Reppy et al. |
| 2006/0135631 A1 | 6/2006 | Kopponen et al. |
| 2006/0151399 A1 | 7/2006 | Brandts et al. |
| 2006/0258531 A1 | 11/2006 | Koyama et al. |
| 2006/0272982 A1 | 12/2006 | Montanari et al. |
| 2007/0025899 A1* | 2/2007 | Marcantonio .................. 423/53 |
| 2007/0098609 A1 | 5/2007 | McConnell |
| 2007/0144944 A1 | 6/2007 | Del Bianco et al. |

FOREIGN PATENT DOCUMENTS

| | | |
|---|---|---|
| JP | 2003320336 A * | 11/2003 |
| JP | 2005272917 | 10/2005 |
| KR | 20080038193 | 5/2008 |
| WO | WO 92/03520 | 3/1995 |
| WO | WO2007032228 | 3/2007 |

* cited by examiner

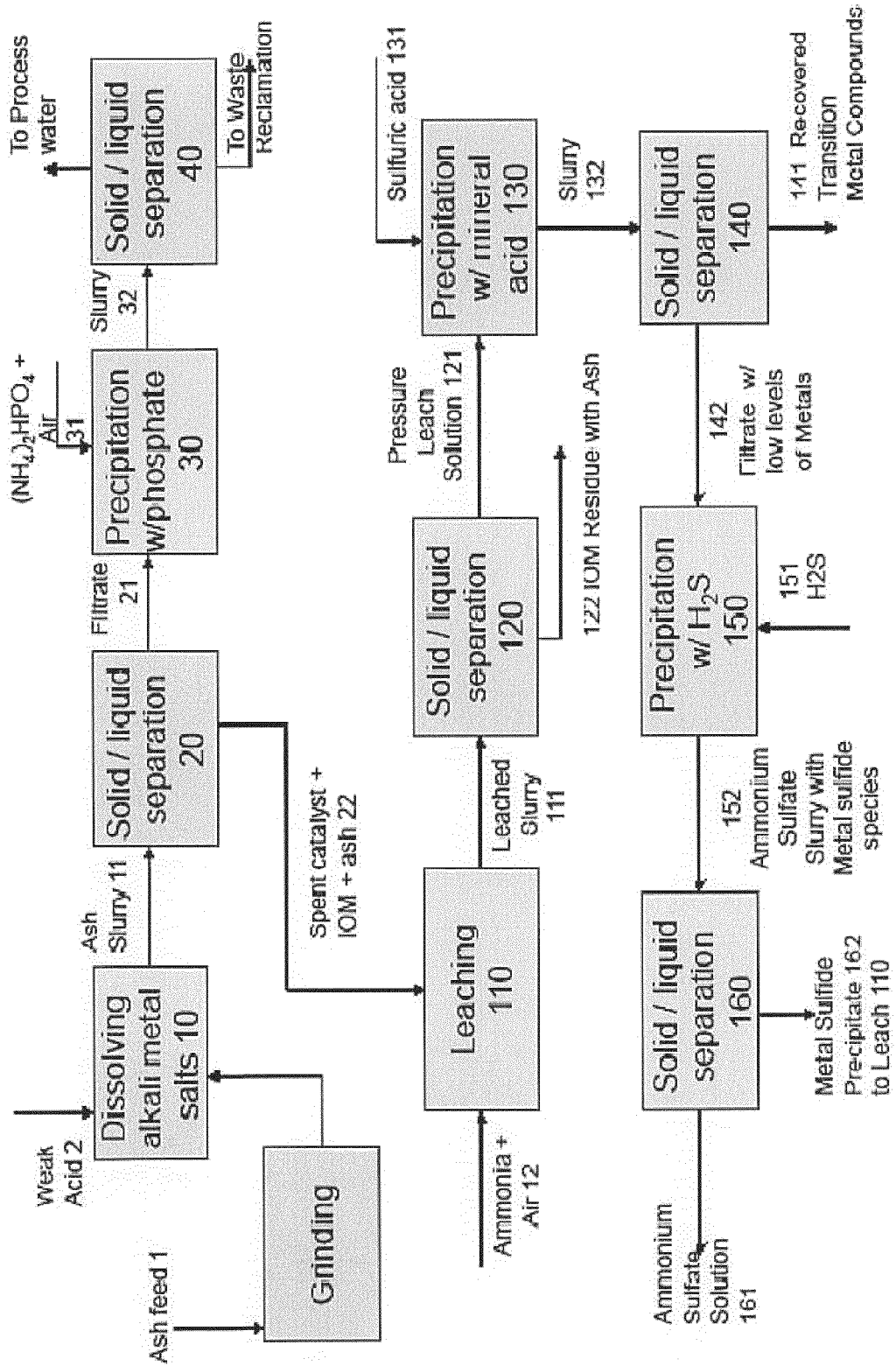

PROCESS FOR RECOVERING METALS FROM COAL LIQUEFACTION RESIDUE CONTAINING SPENT CATALYSTS

RELATED APPLICATIONS

This application is related to and claims priority to U.S. provisional application No. 61/163,331 filed on Mar. 25, 2009.

TECHNICAL FIELD

The invention relates to a process for recovering metals from residues produced from coal liquefaction processes.

BACKGROUND

In a coal liquefaction process, valuable liquid products of lighter molecular weights are obtained from heavy hydrocarbonaceous materials such as coal, tar sands and the like, using a transition metal catalyst, e.g., molybdenum disulfide. As the process progresses, most of the molybdenum typically becomes concentrated in the metals bearing materials, solid residue or heavy bottoms.

Various approaches have been introduced to recover the transition metal components from the spent coal liquefaction catalysts. U.S. Pat. No. 6,153,155 discloses a process in which the solid residue is coked then followed by combustion at a range of 800° C. to 1900° C. The flue dust is treated with ammonia and ammonia carbonate to obtain ammonium molybdate. U.S. Pat. No. 4,417,972 discloses a process in which the insoluble molybdenum sulphide is converted to soluble molybdenum oxides for subsequent recovery of molybdenum as molybdate. U.S. Pat. No. 4,417,972 discloses a process in which the solid residue is reacted with sulphuric acid in the presence of methanol and an oxidizing agent such as hydrogen peroxide to extract molybdenum into the aqueous phase.

There is still a need for an improved and simple process to recover transition metals including but not limited to molybdenum from coal liquefaction residues.

SUMMARY OF THE INVENTION

In one embodiment, this invention is directed to a method of recovering metals from a metals bearing material comprising: reducing the particle size of at least a portion of the metals bearing material; mixing the metals bearing material in an acid solution to form a first slurry containing at least alkaline earth metal compounds; separating the at least alkaline earth metal compounds from the first slurry to form a first filtrate and a metals bearing material; leaching metals from the metals bearing material to form a pressure leach solution containing transition metals; precipitating and recovering transition metals from the pressure leach solution.

In another aspect, the invention relates to a method for recovering metals, from a deoiled and dried coal liquefaction residue that contains spent catalyst originating from a Group VIB metal sulfide catalyst. In addition to spent catalyst the coal liquefaction residue contains ash and insoluble organic matter. The method comprises: withdrawing a coal liquefaction residue from a coal liquefaction process wherein the coal liquefaction residue contains a spent catalyst; comminution, grinding, or pulverization of deoiled and dried coal liquefaction residue; classifying the pulverized coal liquefaction residue to a selected particle size distribution to form a spent catalyst residue; contacting the spent catalyst residue with a weak acid solution to dissolve alkaline earth metal compounds and form a first slurry containing the spent catalyst, ash, insoluble organic matter and dissolved alkaline earth metal complexes; separating and removing the dissolved alkaline earth metal complexes from the slurry to form a metals bearing materials containing the spent catalyst; leaching the metals bearing materials containing the spent catalyst with an ammonia solution in the presence of air, at a sufficient temperature and pressure to form a pressure leach slurry containing at least a Group VIB soluble metal complex, insoluble organic matter and ash; separating and removing the metals bearing materials from the pressure leach slurry to form a pressure leach solution; precipitating from the pressure leach solution at least a portion of the Group VIB metal, wherein the precipitation is carried out at a first pre-selected pH to precipitate as insoluble metal complexes at least a portion of the Group VIB metal.

BRIEF DESCRIPTION OF THE DRAWINGS

FIG. 1 provides an overview of an embodiment of the metal recovery process.

DETAILED DESCRIPTION

The following terms will be used throughout the specification and will have the following meanings unless otherwise indicated.

As used herein, "coal liquefaction" means any process that converts a feedstock consisting substantially of a heavy hydrocarbonaceous material, such as coal, to a liquid product.

The term "coal liquefaction residue" as used herein means the solid residuum or residue remaining from a coal liquefaction process, which coal liquefaction residue is sometimes referred to herein, interchangeably, as "heavy bottoms" or "solid residue". In addition to spent catalyst, the heavy bottoms generally consist primarily of high molecular weight liquids boiling above 1000° F., ash, and unconverted carbonaceous solids. In one embodiment, the coal liquefaction residue (including the spent catalyst) contains about 0.1 to 10% molybdenum by weight. In another embodiment, the coal liquefaction residue (excluding the spent catalyst) contains 40-60 wt % insoluble organic matter (IOM), and 40-60 wt. % ash. In a second embodiment, the ash contains between 1-5 wt % Al, 0.1-3 wt % Ba, 2-10 wt % Ca, 1-5 wt % Fe, 1-3-wt % Mg, 1-5-wt % S, 3-10 wt % Si and 40-60 wt % C.

The term "heavy hydrocarbonaceous material" means, at least, tar sands, thermal tars (from visbreaking or other similar thermal processes), coal, coal char, oil shale, petroleum residue, liquefaction bottoms, coke, peat, wood and similar carbonaceous materials containing a relatively high ratio of carbon to hydrogen. In one embodiment the heavy hydrocarbonaceous material is coal; non-limiting examples of which include anthracite, bituminous coal, sub-bituminous coal, and lignite and mixtures thereof.

As used herein, the phrase "one or more of" or "at least one of" when used to preface several elements or classes of elements such as X, Y and Z or $X_1$-$X_n$, $Y_1$-$Y_n$ and $Z_1$-$Z_n$, is intended to refer to a single element selected from X or Y or Z, a combination of elements selected from the same common class (such as $X_1$ and $X_2$), as well as a combination of elements selected from different classes (such as $X_1$, $Y_2$ and $Z_n$).

As used herein, the term "spent catalyst" refers to a catalyst used in a coal liquefaction operation and, as a result of such use, exhibits diminished catalytic activity. For example, if a reaction rate constant of a fresh catalyst at a specific temperature is assumed to be 100%, the reaction rate constant for a spent catalyst at the same temperature is 80% or less in one embodiment and 50% or less in another embodiment. In one embodiment, the metal constituents of the spent catalysts are generally one or more transition metals, e.g., Mo, W, Ni, V, Cr, Co and the like. In another embodiment, the transition metals are selected from Groups VIB metals. The most commonly encountered metal to be recovered is molybdenum. In one embodiment, the metals recovered from the spent catalyst are sulfides of Mo and W. In one embodiment, the spent catalyst originates from commercially available coal liquefaction catalysts such as Molyvan™ L, Molyvan 822™, Molyvan and Molyvan 807™. In yet another embodiment, the spent catalyst originates from a catalyst precursor of the formula $[(C_nH_{2n+1})_4N]_aM_bO_cH_d$, where n=1 to 8, a=2 to 6, b=2 to 12, c=7 to 48, and d=0 to 3, and M is at least a metal from Groups VB and VIB.

In the sections that follow, the reference to "molybdenum" is by way of exemplification only for the transition metal(s) present in the spent coal liquefaction catalyst for recovery. This "molybdenum" reference is not intended to exclude other transition catalysts, e.g., Group VIB metals, in the catalyst formula. Similarly, the reference to "vanadium" is by way of exemplification only, and is not meant to exclude other Group VB metals that may be present in the spent catalyst and/or the coal liquefaction residue.

In the sections that follow, the reference to "incoming molybdenum" (or "incoming vanadium," etc.) refers to the amount of metal that is initially present in the spent catalyst and/or coal liquefaction residue prior to the metal recovery process.

The term "ash" as used herein generally assist refers to ash-forming minerals or other inorganic matter, e.g., alkaline earth metal complexes such as metal oxides originating from desulfurizing agents employed in the coal liquefaction process.

The Periodic Table of the Elements referred to herein is the Table approved by IUPAC and the U.S. National Bureau of Standards, an example is the Periodic Table of the Elements published by Los Alamos National Laboratory's Chemistry Division accessible via the World Wide Web at http://periodic.lanl.gov/elements.

FIG. 1 is a simplified brief overview of one embodiment of the metal recovery process. Prior to metal recovery, the coal liquefaction residue containing the spent catalyst is first washed/deoiled and dried to remove more than 98 wt % of the hydrocarbon and product oils from the residue. Numerous methods for deoiling/removing oils from solids containing spent catalysts are known in the art. In one embodiment of this invention, the residue containing spent catalysts is deoiled in contact with a sub-critical dense phase gas in a process as described in WO06117101A1. In another embodiment, the residue is deoiled with the use of an organic solvent, e.g., xylene, benzene, toluene, kerosene, etc., under an inert atmosphere, and then dried to remove the organic solvent. Following deoiling, the solvent is stripped and separated from the hydrocarbon oil and recycled. The recovered oil is recycled to the upstream hydroprocessing unit. In yet another embodiment, deoiling is carried out using separation techniques including membrane/ion exchange, nano-filtration, cross flow filtration and the like, reducing the hydrocarbon content to less than 2 wt %.

After deoiling, the deoiled residue is dried generating "ash feed" for metals reclamation. The deoiling/drying step is not shown in FIG. 1.

Comminution, Classification & Solids Thickening of Ash Feed: The ash feed, consisting of coarse, minus 1-inch solids, is fed into a ball mill containing ½-inch & 1-inch steel media, in closed circuit with cyclones for classification. Cyclone feed, at 70 wt % solids, is classified by a cyclone overflow passing $P_{90}$ of 200-mesh at 25-wt % solids; coarse cyclone underflow returns to combine with ball mill feed. The cyclone overflow is partially dewatered in a high rate thickener with appropriate flocculent addition; the clarified thickener overflow solution is recycled to the comminution circuit and the thickener underflow, comprising $P_{90}$ 74-micron ground ash feed, at 50-wt % solids is pumped to a holding tank.

Dissolution of Alkaline-Earth Metals. In one embodiment, such as in FIG. 1, the ash feed for metal recovery comprises the spent catalyst, insoluble organic matter (IOM) and ash with high amounts of inorganic matter, including alkaline earth metals such as calcium and magnesium salts, etc., and metal-containing oxides such as aluminum, iron and silicon formed by the oxidation of some of the metal containing catalyst residues. In this step, the ash feed 1 from comminution is mixed with an acid solution 2 of an inorganic or organic acid to partially dissolve the alkaline earth metal salts and form an ash slurry 11 in an amount of 10 to 25 wt % solids. In one embodiment, at least 60% of the alkaline earth metal complexes together with Aluminum and Iron in the ash feed are dissolved into solution. In another embodiment, at least 80% of the alkaline earth metal complexes together with Al & Fe are dissolved into solution. In another embodiment, the acid is a weak inorganic acid selected from sulfuric acid, nitric acid, hydrochloric acid, and phosphoric acid. In still another embodiment, the acid is a water soluble organic acid such as formic acid, acetic acid, propionic acid, sulfamic acid and trichloro-acetic acid.

In one embodiment, the acid-containing mixture is incubated in a mixing tank 10 (with agitation, if desired, to shorten the reaction time) to solubilize at least 70% of the desired alkaline earth metals. In a second embodiment, the acid dissolution is carried out at a temperature of 35-80° C. for a period of 1-4 hrs. In a third embodiment, the acid incubation is at 55° C. for 0.5 hrs to dissolve at least 70% of the alkaline earth metals in the ash feed together with Aluminum and Iron.

In one embodiment, the weak acid 2 is used in an amount sufficient to stoichiometrically react with the alkaline earth metals to form the corresponding metal compounds in solution. In another embodiment, the amount of acid added into the reaction mixture is 1.0 to 5.0 times the stoichiometric content of the alkaline earth metal compounds in the ash feed.

In one embodiment, the weak acid solution has a concentration ranging from 5% to 35%, with the optimal concentration depending on feed conditions (e.g., calcium, magnesium and barium carbonate content in the ash) and the desirable concentration of the target salt in the solution produced. In a third embodiment, the ash feed is mixed with an acid solution selected from any of: 10% to 30% Sulfamic acid; 10% to 25% $HNO_3$; and 10% to 30% acetic acid. In one embodiment, the acid used is 15% to 20% $HNO_3$. In another embodiment, the acid used is 20% to 30% sulfamic acid. In yet another embodiment, the ash feed is acidified with 25% sulfamic acid at 15 wt % slurry solids density.

Removing Alkaline Earth Metals From Filtrate: Following the acid dissolution step 10, the liquid phase is isolated to recover the alkaline earth metal salts dissolved therein. In one embodiment, the ash slurry 11 is subject to a liquid/solid separation via physical methods known in the art, e.g., settling, centrifugation, decantation, or filtration. In one embodiment, the separation is done via a vertical type centrifugal filter or a vacuum filter, and the like 20, into a liquid stream 21 containing the solubilized alkaline earth metals and solid residue 22 containing ash, insoluble organic matter and spent catalyst.

In one embodiment, a phosphate 31 is added together with air to the precipitating/mixing vessel 30 to precipitate out the alkaline earth metals at a pH of 7. In another embodiment (not shown), the phosphate is added to the liquid stream (filtrate) 21. The phosphate used to precipitate the alkaline earth metal as insoluble metal complexes may include the phosphates of sodium, potassium and ammonium. In one embodiment, the phosphate is used at a strength ranging from 0.5 to 5.0 normal. In a second embodiment, diammonium hydrogen phosphate in the presence of injected air is used to quantitatively precipitate the insoluble alkaline earth metal sulfates together with Aluminum and Iron at a pH around neutral.

In another embodiment (not shown), a water soluble carbonate 31 is added to the precipitating/mixing vessel 30 to precipitate out the alkaline earth metals. In another embodiment (not shown), the soluble carbonate is added to the liquid stream (filtrate) 21. The soluble carbonate used to precipitate the alkaline earth metals as insoluble metal complexes may include the carbonates of sodium, potassium and ammonium. In one embodiment, the water soluble carbonate is used in a strength ranging from 0.5 to 5.0 normal. In another embodiment, ammonium carbonate in the presence of air is used to precipitate the insoluble alkaline earth metal carbonates together with Aluminum and Iron at a pH around neutral.

In one embodiment, at least 90% of the alkaline earth metals, e.g., calcium, magnesium together with Aluminum and Iron is recovered as a phosphate residue with the rest remaining in solution. In another one embodiment, the slurry 32 is subject to a liquid/solid separation process 40 wherein the insoluble alkaline earth metal complexes together with Aluminum and Iron (as a white solid residue) is sent to waste reclamation, and the filtrate is recovered for use as process water.

Leaching Ash Feed: In one embodiment and after the removal of alkaline earth metals from the ash feed, the solid residue 22 containing ash, IOM and transition metals to be recovered is leached with an aqueous solution containing ammonia 12 and injected air. In one embodiment, the leaching is carried out in an autoclave 110, a multi-chambered, agitated vessel, at a sufficient temperature and pressure, in which ammonia and air are supplied to induce leaching reactions, to leach group VIB transition metals into solution and form soluble metal complexes.

In another embodiment, wherein the ash feed 1 for metal recovery comprises the spent catalyst, high amounts of insoluble organic matter and ash including alkaline earth metals such as calcium and magnesium salts, etc., and metal-containing oxides formed by the oxidation of some of the metal containing catalyst residues, the solid residue 22 is leached with an aqueous solution containing ammonia 12 and injected air. In one embodiment, the leaching is carried out in an autoclave 110, a multi-chambered, agitated vessel at a sufficient temperature and pressure, in which ammonia, ammonium carbonate and air are supplied to induce leaching reactions, wherein the group VIB transition metals are leached into solution forming soluble metal complexes.

In one embodiment, at least 70 wt % of the group VIB metals are leached into solution. In another embodiment the group VIB metal is molybdenum, which is leached and converted into molybdate compounds, including ammonium orthomolybdate. In such an embodiment, at least 75 wt % of the molybdenum is leached into solution.

As shown in an embodiment depicted in FIG. 1, the spent catalyst in stream 22 is pressure leached according to U.S. Pat. No. 7,485,267, with the addition of ammonia and air in stream 12 to induce solubilization or leaching of metal sulfides from the spent catalyst. In such an embodiment of the ammoniacal pressure leach, the leaching is carried out at a pressure proportional to the temperature. In a second embodiment, a sufficient leach temperature is between 120 to 250° C. In a third embodiment, the sufficient leach temperature is between 135 to 225° C. In one embodiment, the sufficient autoclave pressure is in the range of 0-1200 psig. In a second embodiment, from 100-1000 psig. In a third embodiment from 300 psig through about 800 psig.

In one embodiment, the spent catalyst particles are pressure leached from 60 minutes to 360 minutes. In another embodiment, the spent catalyst particles are pressure leached from 120 minutes to 300 minutes. In still other embodiments, the pressure leach is for a period of less than 120 minutes.

In one embodiment, the concentration of the leaching species and the pH of the leach solution are optimized with sufficient amounts of ammonia to complex molybdenum, and with sufficient free ammonia to control the pH within a range of 9 to 12. In one embodiment, the initial molar ratio of ammonia to molybdenum is in the range of 2:1 to 5:1. In another embodiment, the ammonia concentration is maintained at a level of at least 5 wt %, and in a range of 2-10 wt % in yet another embodiment.

In a similar embodiment, the pressure leaching is carried out in an ammoniacal media at a pressure ranging from 0 to 1200 psig, at a temperature ranging from 100-300° C., and at a pH level of 8.0 or higher to allow the leaching reaction to progress efficiently. In another similar embodiment, the pH level is maintained between a range of 9 to 12.

In another embodiment (not illustrated in FIG. 1), the spent catalyst is first caustic leached under atmospheric pressure, according to U.S. Pat. No. 6,180,072, for an extended period of time before the pressure leaching step.

In yet another embodiment (not shown in the FIGURE), the leached slurry 111 following cooling is transferred to a depositing/holding tank equipped with appropriate equipment to further reduce the leached slurry temperature to 90° C. or less, prior to the next separation step.

Separating Solids from Pressure Leach Slurry: The partially cooled leached slurry 111 is subject to liquid-solid separation via physical methods known in the art, e.g., settling, centrifugation, decantation, or filtration using a vertical type centrifugal filter or a vacuum filter or a plate and frame filter, and the like, into a liquid stream 121 (Pressure Leach Solution or PLS) containing the group VIB metal complexes together with ammonium sulfate. The solid residue stream 122 comprises ash and insoluble organic matter. The filtrate or PLS stream 121 is subject to a subsequent precipitation step.

In one embodiment, liquid-solid separation of the leached slurry 111 is carried out in a filtration device 120, wherein the solid residue 122 containing ash and insoluble organic matter is separated out in the form of a filter cake from the PLS containing primarily ammonium molybdate and ammonium sulfate.

In one embodiment following liquid-solid separation, the PLS stream contains 2 to 10 gpL (grams per liter) molybdenum and 15 to 100 gpL ammonium sulfate. In a second embodiment, the PLS stream contains 1 to 5 gpL molybdenum and 10 to 50 gpL ammonium sulfate.

Precipitating Metal Complexes from the Pressure Leach Solution: In one embodiment of this step, the pH of the PLS 121 is controlled to a level at which selective precipitation of the metal complexes occurs ("pre-selected pH"), precipitating as a metal complex at least 90% of the Group VIB metal.

In one embodiment, the pH is adjusted to precipitate as metal complexes at least 95% of the Group VIB metal. In another embodiment, the pre-selected pH is less than about 3.5 to start precipitating at least 90% of molybdenum complexes in solution. In another embodiment wherein the Group VIB metal comprises tungsten, the pre-selected pH is from pH 1.0 to about 2.0 to initiate precipitation of at least 95% of soluble tungsten complexes. Generally, several metals can form a precipitate at a given pH. For example, at a pH level of less than 3, Mo and Ni or Co (if any) precipitate although more molybdenum precipitates relative to nickel. Additionally, the precipitating concept described herein can be repeated at another pH or pH range to precipitate other metals.

In one embodiment wherein the group VIB metal is molybdenum and there is an interest in precipitating most or a major portion of the molybdenum, the pH of the PLS is reduced from greater than 9.0 to less than 3.5 to precipitate greater than 90% of the molybdenum. In a second embodiment, the pH of the PLS is adjusted to a level of 3.0 to 3.3 to precipitate greater than 92% of the Molybdenum. In a third embodiment, the pH of the PLS is adjusted to a level of 2.65 to 3.0 to precipitate greater than 95% of the Molybdenum.

In one embodiment, a strong mineral acid 131 is added to the precipitating/mixing vessel 130 to adjust the pH. In another embodiment (not shown), the acid is added to the pressure leach solution 121 (PLS) stream. The acid used to precipitate the metal complex may include any inorganic mineral acid with a relatively high ionization constant. In one embodiment, the acid is used in a strength ranging from 1.0 to 12.0 normal. In another embodiment, the acid is selected from the group of sulfuric acid, hydrochloric acid, phosphoric acid, nitric acid and the like.

In another embodiment (not shown), a sulfur compound having a sulfhydryl group or an ionized sulfhydryl group or a sulfur compound, which is capable of producing a sulfhydryl group or an ionized sulfhydryl group, is used to adjust the pH of the PLS and induce precipitation. Examples include but are not limited to any sulfur compound which has a sulfhydryl (—SH) group or an ionized sulfhydryl group (—S(−1)). Compounds containing a sulfhydryl or an ionized sulfhydryl group include hydrogen sulfide and inorganic compounds containing sulfide ion, hydrosulfide ion or trithiocarbonate ion as well as organic compounds such as dithiocarbamates, xanthates, mercaptans and the soluble metal salts of these compounds, i.e., the alkaline metal and alkaline earth metal salts. Furthermore, sulfur compounds which are capable of producing a sulfhydryl or an ionized sulfhydryl group, e.g., thioacetamide and reducible disulfides, can also be used. Examples of organic sulfur compounds which can be used include sodium, potassium or calcium salts of the following ions: ethyl xanthate ion, glucose xanthate ion, isopropyl xanthate ion, dimethyldithiocarbamate ion or diethyldithiocarbamate ion. Examples of inorganic sulfur compounds include sodium trithiocarbonate, potassium trithiocarbonate, calcium trithiocarbonate, sodium sulfide, potassium sulfide or calcium sulfide In one embodiment (not shown in FIG. 1), the sulfur compound is a sulfide-containing compound, e.g., a water soluble sulfide, a water soluble polysulfide, or mixtures thereof, is employed to adjust the pH of the PLS 121 to a level at which precipitation of the metal complexes occurs. In one embodiment, hydrogen sulfide, a combination of hydrogen sulfide and caustic soda, ammonium sulfide, NaHS, or $Na_2S$, or mixtures thereof is used in an amount of about 0.05 to 4.0 molar to precipitate out molybdenum and the like from the PLS 121.

In one embodiment, the of precipitation is carried out under mixing conditions at a temperature in the range of 50 to 95° C., a pH level of 1 to 4, and for a sufficient amount of time, e.g., for at least 1 hour, for at least 90% of the molybdenum in the PLS to precipitate out as a metal complex. In another embodiment, the precipitation is carried out at a temperature of 70° C. and a pH level of between 2.5 to 3.3. In one embodiment, at least 95% of the molybdenum precipitates out after 2 hours as a molybdenum compound, such as ammonium octamolybdate.

In one form of the invention, the pH of the PLS is continuously regulated for at least part of the precipitation step with the continuous addition of the additive, e.g., mineral acid or sulfide-containing compound, to control the rate of the precipitation as well as the type of metal complexes precipitating from the PLS. In one embodiment, a sufficient amount of sulfuric acid (20-96% by weight) is used to adjust the pH of the PLS to less than 3.5. In another embodiment, a sufficient amount of sulfuric acid is added to the PLS to target a pH of 3.0, with the mixture being maintained at a temperature of 60-90° C. for 1 to 3 hours, until 99% of the molybdenum precipitates out as molybdate compounds. It is known in the art that pH controllers can be used to automatically measure and control pH of the PLS for maximizing the amount of metals precipitated from the PLS.

Separating/Recovering Mo Precipitate: After precipitation, the solids are separated from solution by known means including settling, filtration, decantation, centrifugation etc., or combinations thereof. In one embodiment, a filter 140 is used for the solid-liquid separation of slurry 132. In one embodiment, following solid-liquid separation, over 99% of the incoming molybdenum is recovered in the unwashed precipitate 141. In another embodiment, over 96% of the incoming molybdenum is recovered in the unwashed precipitate 141.

In one embodiment, the unwashed precipitate 141 contains 50-80 wt % Molybdenum, less than 1 wt % V, less than 20 wt % ammonium sulfate (Amsul), and 1 to 10 wt % sulfur. In yet another embodiment, the unwashed precipitate 141 contains up to 75 wt % Molybdenum, less than 0.05 wt % V and 10-20 wt % Amsul, has a creamish color and is soluble in warm ammoniacal solution.

In another embodiment, after liquid-solid separation, the cooled precipitate 141 is, optionally, doubled washed with acidic water having a pH in the range of 2-3.5 (not shown in FIG. 1) at ambient temperature to remove adhering ammonium sulfate (Amsul) that may be entrained in the Molybdenum precipitate. A portion of the wash water may be recycled to the precipitation 130 step. The remaining wash water may be added to the supernatant (filtrate) 142 for additional precipitation and recovery of any residual Molybdenum in the filtrate. The solid precipitate 141, containing recovered metals can be routed to a catalyst synthesis operation for the preparation of fresh catalysts. In another embodiment, the solid precipitate 141 undergoes further processing, for separating molybdenum from other transition metals by acid dissolution, filtration & solvent extraction.

The supernatant 142 recovered from the separation step is substantially free of Group VIB base metals. In one embodiment, substantially free means that the supernatant 142 recovered from the separation step contains 0.1 to 3% of the Group VIB metal in the spent dispersed catalyst. In another embodiment, the supernatant 142 is primarily Amsul, with small amounts of molybdenum. In one embodiment, the supernatant 142 contains 0.1 to 2% of the incoming molybdenum. In another embodiment, the supernatant 142 contains from 0.1 to 1% of the incoming molybdenum.

Optional Sulfide Precipitation of Residual Molybdenum: In one embodiment, the pH of the Amsul supernatant 142 (plus optional wash water from washing the precipitate) is adjusted to further precipitate the small amount of metals left in the Amsul filtrate as metal sulfides. In a related embodiment, prior to the precipitation, the pH is adjusted to precipitate at least 95% of the Group VIB metal in the supernatant 142. In one embodiment, the pH is maintained at a level between 5 and 7 at a temperature of 60-95° C., in the presence of $H_2S$, following which a precipitate of Molybdenum sulfides is obtained.

In one embodiment, a water soluble sulfide-containing compound 151, e.g., a water soluble sulfide, a water soluble polysulfide, or mixtures thereof, is added to the Amsul supernatant 142 (and recycled wash water, if any) with pH adjustment, thus precipitating the small amount of metals dissolved therein. In one embodiment, the precipitation is carried out in a mixing tank 150 maintained at a pressure from atmospheric to 100 psig and at a temperature ranging from 50-95° C. In yet another embodiment, ammonia is optionally added to the supernatant (filtrate) 142 to bring the solution pH to around 7 prior to the addition of the water soluble sulfide containing compound. In such an embodiment, the water soluble sulfide-containing compound is selected from the group of hydrogen sulfide, ammonium sulfide, NaHS, $Na_2S$ and mixtures thereof. In another embodiment, hydrogen sulfide is used in an amount of about 0.5 to 2.0 molar to precipitate out molybdenum, tungsten, and the like from the filtrate 142.

Optional Separation/Recovering Residual Molybdenum Sulfides: In the event that a second optional precipitation step (via sulfidation) is employed to further recover Molybdenum from the supernatant (filtrate) 142, the metal sulfide slurry stream from precipitator 150 is sent to a separator 160. In this step, the solid precipitate containing residual metal sulfides is separated from the ammonium sulfate (Amsul) solution by known means including settling, filtration, decantation, centrifugation, etc., or combinations thereof.

In one embodiment, a filter press is used to separate the metal sulfide precipitate 162 from the ammonium sulfate solution 161. The solids 162, containing precipitated metal sulfides, are sent to a holding tank for subsequent metals recovery through the autoclave. In another embodiment, the solids 162, containing precipitated metal sulfides, are sent to a holding tank for off-site disposal to metals reclaimers.

The supernatant 161 recovered from this step is substantially free of Group VIB metals, e.g., W and Molybdenum. In one embodiment, substantially free means a removal rate of at least 95% for the Group VIB metals in the catalyst such as molybdenum. In one embodiment, analysis of the ammonium sulfate solution 161 shows a concentration of 10 to 80 gpL Amsul and less than 100 ppm of the group VIB metals. In a second embodiment, the supernatant 161 has a concentration of 20 to 50 gpL Amsul and less than 50 ppm Molybdenum.

Ammonium sulfate can be recovered from stream 161 using methods known in the art. In one embodiment, the recovered ammonium sulfate is recycled for use as fertilizers.

EXAMPLES

The following illustrative examples are intended to be non-limiting:

Example 1 this example comprises two primary steps; (i) reduction of the coal liquefaction residue (coal bottoms) particle size by any suitable means such as grinding, pulverization or other means of comminution and (ii) conducting a preliminary pressure leaching step. The specific processes results of Example 1 are described as follows:

Feed Comminution: In an 8 inch diameter ball mill containing carbon steel balls, a coarse (minus 595 microns) coal bottoms sample (1000 g) was wet ground in 1470 mL water to a $P_{90}$ of minus 74 microns at 43% solids. Results of analysis of the solids and filtrate collected after comminution are presented in Table 1. Molybdenum in the feed was slightly dissolved during comminution (3% Molybdenum extraction), producing a filtrate containing 0.4 g/L molybdenum following liquid-solid separation.

TABLE 1

Elemental Analyses

|    | Solids (wt %) | Solution (ppm) | Metals Extraction |
|----|---------------|----------------|-------------------|
| Al | 2.53          | <1             | 0.0%              |
| Ca | 3.68          | 457            | 1.8%              |
| C  | 49.5          | <1             | 0.0%              |
| Fe | 1.89          | <1             | 0.0%              |
| Mg | 0.98          | 823            | 12.3%             |
| Mo | 2.06          | 400            | 2.9%              |
| Si | 4.69          | <1             | 0.0%              |
| S  | 1.78          | 1,803          | 14.9%             |

PRESSURE LEACHING: A preliminary ammoniacal pressure leach test was performed on the sample under the following process conditions: using a 4 L stainless steel baffled, batch autoclave (with agitation supplied by dual axial flow impellers (7.6 cm diameter) rotating at 1150 revolutions per minute and vented through a condenser and rotameter) 932 g of ground coal bottoms slurry at 42.9% solids were charged to the autoclave with 1.2 L of water and 0.3 L of 28% $NH_4OH$ at a temperature of 150° C. and a total pressure of 2800 kPa (gauge). Compressed air was added as an oxidant through a sparger at vent rate of 2 L/min. Results of this test indicated major "preg robbing" of molybdenum due to the presence of alkaline earth metals (Ca & Mg) in the coal bottoms samples (see Table 2). Based on this observation and in subsequent tests, the coal bottoms samples were pre-leached in weak acidic solutions prior to pressure leach tests, in order to dissolve the alkaline earth metals.

Example 2 this example comprises five primary steps; (i) acid pre-leaching of the ground coal bottoms, (ii) precipitating metals from a pre-leach solution, (iii) pressure leaching, (iv) metals precipitation and (v) ammonium sulfate purification. The specific processes results of Example 2 are described as follows:

Acid Pre-Leach Of Ground Coal Bottoms: The acid pre-leach tests were carried out in small beakers (1 and 2 L) equipped with overhead agitation. In a typical test, the acid solution was charged to the beaker and heated to the test temperature. The ground catalyst was then added to the beaker, with a residence time of 60 to 90 min. At the conclusion of the test, the slurry was filtered to recover the filtrate and the leach residue. Solids were washed with DI water and kept as a wet cake. The filtrate and wash water were analyzed for Mo, Ca, Ba, Mg, Al, Fe and S by inductively coupled plasma (ICP) emission spectroscopy. The acid pre-leach test (Table 3) conducted in 25% sulfamic acid solution at 60° C. resulted in calcium and magnesium extractions of up-to 85% for calcium and 99% for magnesium. Significant aluminum and iron dissolution occurred up-to 70% and 89% respectively.

Example 1

Metals Precipitation From Pre-Leach Solutions

The metals precipitation tests were carried out in a 0.5 L beaker equipped with an air sparger. Air was sparged into the solution at 145 mL/min. The tests were conducted at a temperature of 25° C., with a residence time of 60 min. At the conclusion of the test, the slurry was filtered to recover the filtrate for analysis. Solids were washed and dried at room temperature. The filtrate was analyzed for calcium, magnesium and aluminum by inductively coupled plasma (ICP) emission spectroscopy. Table 4 depicts the results of the metals precipitation tests that were conducted on sulfamic acid solutions containing about 4 g/L aluminum, 7 g/L calcium and 2 g/L magnesium. With the addition of diammonium hydrogen phosphate, essentially all of the calcium, magnesium and aluminum were precipitated out of solution at pH 7. A white precipitate of calcium, magnesium and aluminum phosphates was formed during the test. The final filtrate contained 0.028 g/L aluminum, 0.06 g/L calcium and 0.009 g/L magnesium.

Example 2

Pressure Leaching

The pressure leach tests were conducted in a one gallon stainless steel autoclave equipped with baffles and with agitation supplied by dual axial flow impellers. A thermocouple within a thermowell inserted into the autoclave was connected to a temperature controller to measure and control the slurry temperature. Heat supplied by an external natural gas flame below the autoclave. The leaching reaction was carried out a temperature of 150° C. and a total pressure of 2800 kPa. Air was supplied from a compressed gas cylinder through a regulator and sparge tube, which exited between the axial flow impellers in the autoclave at a vent rate of 2 L/min. The autoclave gas phase within the autoclave was continuously vented at a controlled rate through a condenser and rotameter and bubbled through an acid solution to scrub ammonia from the vent gas. A sampling line within the autoclave was connected to an external sampling bomb with appropriate tubing and valving, to obtain kinetic samples from the autoclave during the test. Results are set forth in Table 5. The maximum molybdenum extraction during the test work was 80%. The low molybdenum extraction was due to the co-precipitation of molybdenum in the presence of calcium. A relationship exists between the molybdenum extraction during pressure leaching and the concentration of calcium in the feed material (after the acid pre-leach treatment) during the testwork. The molybdenum extraction increased with decreasing concentration of calcium in the feed material.

METALS PRECIPITATION: The pressure leach solution stream with a pH of 9.2 was adjusted to ~3.0 by single stage concentrated sulfuric acid (96%) addition. The PLS composition included 33 gpL free $NH_3$, 3.5 gpL Mo and 21 gpL ammonium sulfate (Amsul). After mixing for about 2-hours at a temperature of 80° C., about 99% of the molybdenum precipitates out as a molybdenum compound. The slurry was cooled to ambient and filtered to remove the precipitate. The precipitate was optionally double-washed with pH 3.0 water at ambient temperature to remove entrained ammonium sulfate; minimal re-solubilization of Mo occurred. The final solution (including wash) analyzed 0.05 gpL Mo for a metal precipitation efficiency of 98.6% Mo. The creamish colored precipitate is soluble in warm ammoniacal solution.

AMSUL STREAM CLEAN-UP: In the next step, in accordance with the process described in U.S. Pat. No. 7,658,895, a portion of the wash water was recycled to the autoclave feed. The remaining wash water and filtrate, which was primarily ammonium sulfate (Amsul) containing low levels of Mo, solution pH was increased to about 7 with ammonia addition followed by sulfidation with $H_2S$ gas under pressure at 200-kPa (30-psi) for 2-hours. The pH was maintained between 6 & 7 at a temperature of 80° C. A precipitate of Mo sulfides is obtained. The slurry underwent liquid-solid separation and the Amsul stream was further processed for recovering ammonium sulfate for use as fertilizer. Analysis of the final Amsul stream showed 40 gpL Amsul with <10 ppm Mo.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

TABLE 2

| Time, min | Head | 45 | 90 | 135 | 180** | 225 | 270 | 300 |
|---|---|---|---|---|---|---|---|---|
| | | | | Slurry Sample | | | | |
| Weight, g | | 125.8 | 117.9 | 87.8 | 60.3 | 88.4 | 89.4 | 45 |
| Volume, mL | | 121 | 114 | 86 | 59 | 86 | 88 | 44 |
| Pulp Density, g/L | | 1040 | 1034 | 1021 | 1022 | 1028 | 1016 | 1023 |
| Solids, g | 400 | 21 | 18.7 | 14.3 | 13.2 | 13.3 | 14.6 | 7.1 |
| Solids, g/L | 200 | 174 | 164 | 166 | 224 | 155 | 166 | 161 |
| Solids, % | 18.6 | 16.7 | 15.9 | 16.3 | 21.9 | 15.0 | 16.3 | 15.8 |

TABLE 2-continued

| Time, min | Head | 45 | 90 | 135 | 180** | 225 | 270 | 300 |
|---|---|---|---|---|---|---|---|---|
| Solution Analysis | | | | | | | | |
| pH | | 10.2 | 10.1 | 10.1 | 10.2 | 10.1 | 10.1 | 10.2 |
| NH$_3$ (free)*, g/L | 37.5 | 19 | 18 | 17 | 18 | 14 | 14 | 12 |
| Mo | | 0.877 | 0.888 | 0.796 | 0.717 | 0.644 | 0.593 | 0.475 |
| S | | 3.93 | 3.4 | 2.9 | 2.98 | 2.84 | 2.9 | 2.52 |
| (NH$_4$)$_2$SO$_4$ | | 16.2 | 14.0 | 11.9 | 12.3 | 11.7 | 11.9 | 10.4 |
| Extraction, %*** | | | | | | | | |
| Mo | | 21 | 22 | 19 | 17 | 16 | 14 | 12 |

*titrated with 2.94N H$_2$SO$_4$
**at 150 min, 100 mL of NH$_4$OH was injected into autoclave via sample line
***estimated from solution and head solids analyses

TABLE 3

Pre-Leach Test Sulfamic Acid Calcined Coal Bottoms

| Time, min | Head | 20 | 40 | DX (60) |
|---|---|---|---|---|
| Slurry Sample | | | | |
| Weight, g | 499.0 | 27.8 | 25.7 | 350.0 |
| Volume, mL | 399.0 | 25.7 | 22.0 | 300.0 |
| Pulp Density, g/L | 1250 | 1082 | 1168 | 1167 |
| Solids, g | 100 | 5.2 | 3.7 | 74.5 |
| Solids, g/L | 250 | 202 | 168 | 248 |
| Solids, % | 20.0 | 18.7 | 14.4 | 21.3 |
| Solution Analysis | | | | |
| pH | 0.4 | 0.4 | 0.4 | 0.4 |
| Al, g/L | — | 3.46 | 3.5 | 4.46 |
| Sb | — | <0.013 | <0.013 | <0.013 |
| As | — | <0.01 | <0.01 | <0.01 |
| Ba | — | 0.00114 | 0.00095 | 0.00096 |
| Bi | — | <0.01 | <0.01 | <0.01 |
| Cd | — | <0.0025 | <0.0025 | <0.0025 |
| Ca | — | 6.85 | 6.47 | 7.78 |
| Cr | — | 0.0287 | 0.0399 | 0.0544 |
| Co | — | <0.005 | <0.005 | <0.005 |
| Cu | — | <0.005 | <0.005 | <0.005 |
| Fe | — | 2.52 | 3.21 | 4.22 |
| Pb | — | <0.01 | <0.01 | <0.01 |
| Mg | — | 1.88 | 1.88 | 2.57 |
| Mn | — | 0.0479 | 0.0486 | 0.0613 |
| Mo | — | 0.0616 | 0.0368 | 0.0393 |
| Ni | — | 0.0366 | 0.0421 | 0.0544 |
| Si | — | 0.92 | 0.797 | 0.93 |
| Na | — | 1.63 | 1.56 | 1.94 |
| Sr | — | 0.271 | 0.248 | 0.299 |
| S | — | 57.6 | 51.9 | 63.5 |
| Ti | — | 0.0275 | 0.0212 | 0.0238 |
| V | — | 0.0038 | 0.0041 | 0.005 |
| Zn | — | 0.007 | 0.0073 | 0.0084 |
| Zr | — | 0.002 | 0.002 | 0.002 |
| Solids Analysis, % | | | | |
| Al | 2.53 | | | |
| Cd | <0.01 | | | |
| Ca | 3.68 | | | |
| C | 49.5 | | | |
| Cr | 0.0346 | | | |
| Co | <0.04 | | | |
| Cu | <0.01 | | | |
| Fe | 1.89 | | | |
| Pb | <0.19 | | | |
| Mg | 0.98 | | | |
| Mn | 0.0103 | | | |
| Mo | 2.06 | | | |
| Ni | <0.04 | | | |
| Si | 4.69 | | | |
| S | 1.78 | | | |
| Sn | <0.19 | | | |
| Ti | 0.219 | | | |
| V | <0.01 | | | |
| Zn | <0.04 | | | |
| Extraction, % (solution basis) | | | | |
| Mo | | 1.2 | 0.7 | 0.8 |
| Ca | | 74.3 | 70.2 | 84.4 |
| Mg | | 76.6 | 76.6 | 104.7 |
| Al | | 54.6 | 55.2 | 70.4 |
| Fe | | 53.2 | 67.8 | 89.1 |

TABLE 4

Metals Precipitation Test on Sulfamic Acid Solution with Ammonium Hydrogen Phosphate Addition

| Time, min | (NH4)3PO4, g | (NH4)OH, mL | pH |
|---|---|---|---|
| 0 | 0 | 0 | 0.98 |
| 10 | 10 | 0 | 1.34 |
| 20 | 10 | 0 | 2.84 |
| 30 | 10 | 0 | 4.1 |
| 40 | 0 | 12.5 | 6.9 |
| 60 | 0 | 0 | 6.9 |

Sample Final Dx

| Filtrate, mL | Solids, g |
|---|---|
| 160 | 55.7 |

Comments
DX filtrate is clear
Filtercake is white

| Time, min | Head | DX |
|---|---|---|
| Solution Analysis | | |
| pH | 0.98 | 7.0 |
| Al, g/L | 3.48 | 0.028 |
| Sb | <0.013 | <0.013 |
| As | <0.01 | <0.01 |
| Ba | 0.00171 | |
| Bi | <0.01 | <0.01 |
| Cd | <0.0025 | <0.0025 |
| Ca | 6.96 | 0.0615 |
| Cr | 0.0581 | <0.0015 |
| Co | <0.005 | <0.005 |
| Cu | <0.005 | <0.005 |
| Fe | 3.76 | <0.005 |
| Pb | <0.01 | <0.01 |

TABLE 4-continued

| | | |
|---|---|---|
| Mg | 2.18 | 0.0092 |
| Mn | 0.0539 | <0.0015 |
| Mo | 0.0581 | 0.0068 |
| Ni | 0.053 | <0.005 |
| K | 0.12 | 0.098 |
| Se | <0.02 | <0.02 |
| Si | 0.557 | 0.034 |
| Na | 1.41 | 1.13 |
| Sr | 0.321 | <0.002 |
| S | 58.9 | 51.4 |
| Te | <0.05 | <0.05 |
| Sn | <0.03 | <0.03 |
| Ti | 0.0314 | <0.001 |
| U | <0.03 | <0.03 |
| V | 0.0035 | <0.001 |
| Zn | 0.0073 | <0.005 |
| Zr | <0.002 | <0.002 |

TABLE 5

Pressure Leach Test on Pre-Leached Coal Bottoms Composite Catalyst

| Time, min | Head | 30 | 60 | 90 (DX) |
|---|---|---|---|---|
| Slurry Sample | | Slurry | Slurry | Slurry |
| Weight, g Volume, mL | | 64.0 | 54.7 | 1678 |
| | | 63 | 54 | 1570 |
| Pulp Density, g/L | | 1016 | 1013 | 1069 |
| Solids, g | 338 | 9.5 | 8.2 | 299 |
| Solids, g/L | 197 | 151 | 152 | 190 |
| Solids, % | 16.2 | 14.8 | 15.0 | 17.8 |
| Solution Analysis | | | | |
| SG | | | | |
| pH | | 10.1 | 10.0 | 9.9 |
| NH3 (free)*, g/L | 41 | 17 | 20 | 16 |
| Mo | | 3.450 | 3.33 | 3.5 |
| Ni | | <0.005 | <0.005 | <0.005 |
| V | | <0.001 | <0.001 | <0.001 |
| S | | 4.46 | 4.67 | 5.11 |
| (NH4)2SO4 | | 18.4 | 19.2 | 21.0 |
| ORP, mV | | −8 | −6 | −5 |
| Solids Analysis, % | | | | |
| Mo | 2.55 | | | 0.45 |
| Ni | 0.09 | | | <0.05 |
| V | <0.02 | | | <0.02 |
| Fe | 1.42 | | | 0.46 |
| C | 62.5 | | | 57.0 |
| Ca | 0.76 | | | 0.65 |
| Mg | 0.37 | | | 0.25 |
| S | 3.07 | | | 0.22 |
| Extraction, %** | | | | |
| Mo | | 69 | 66 | 70 |
| Ni | | 3 | 3 | 3 |
| V | | 3 | 3 | 3 |
| S | | 74 | 77 | 84 |
| Extraction, %*** | | | | (carbon tie) |
| Mo | | | | 80 |
| Ni | | | | 36 |
| V | | | | −10 |
| S | | | | 92 |

*titrated with 2.94N H2SO4 in Research lab
**Solution basis
***Solids basis

The invention claimed is:

1. A method of recovering metals from a coal liquefaction residue containing a spent catalyst comprising:
   (a) deoiling and drying the coal liquefaction residue to form an ash feed;
   (b) reducing the particle size of the ash feed;
   (c) mixing the ash feed in a weak acid solution to form a first slurry containing at least alkaline earth metal compounds;
   (d) separating the at least alkaline earth metal compounds from the first slurry to form a first filtrate and a metals bearing material;
   (e) pressure leaching metals from the metals bearing material in the presence of ammonia and air to form a pressure leach slurry containing transition metals;
   (f) precipitating and recovering transition metals from the pressure leach slurry.

2. The method of claim 1 wherein step (b) comprises comminution of the ash feed to a particle size distribution wherein at least 70% of the metal bearing materials passes 200-mesh.

3. The method of claim 1 wherein a coal liquefaction residue comprises inorganic material, ash and a spent catalyst.

4. The method of claim 3 wherein the spent catalyst comprises one or more transition metals selected from the group consisting of Group VIB metals and sulfides thereof.

5. The method of claim 4 wherein the spent catalyst comprises molybdenum.

6. The method of claim 1 wherein the ash feed contains about 0.1% to 10% molybdenum by weight.

7. The method of claim 1 wherein the acid solution of step (c) is a weak acid solution selected from the group consisting of weak solutions of sulfuric acid, nitric acid, hydrochloric acid and phosphoric acid.

8. The method of claim 1, wherein the weak acid solution of step (c) is a water-soluble organic acid selected from the group consisting of formic acid, acetic acid, propionic acid, sulfamic acid and trichloro-acetic acid.

9. The method of claim 1 wherein step (c) is carried out at a temperature 35° C. and 80° C. for a time between about 1 to 4 hours.

10. The method of claim 9 wherein at least 70% of the at least alkaline earth metal compounds of step (c) are dissolved.

11. The method of claim 1 wherein the first filtrate of step (d) comprises solubilized alkaline earth metals and materials consisting of ash, insoluble organic matter and spent catalyst.

12. The method of claim 11 wherein the solubilized alkaline earth metals are precipitated from the first filtrate by contacting the first filtrate, in the presence of air, with a phosphate at a pH of about neutral.

13. The method of claim 12 wherein the phosphate is selected from the group consisting of ammonium phosphate, potassium phosphate and sodium phosphate.

14. The method of claim 13 the phosphate strength ranges from about 0.5 to 5.0 normal.

15. The method of claim 1 wherein the coal liquefaction residue comprises 0.1 to 10% Mo by weight.

16. The method of claim 15 wherein the coal liquefaction residue comprises 40 to 60% by weight insoluble organic matter and is 40 to 60% by weight ash.

17. The method of claim 16 wherein the ash comprises between 1-5 wt. % Al, 1-3 wt. % Ba, 2-10 wt. % Ca, 1-5 wt. % Fe, 1-5 wt. % Na, 3-10 wt. % Si and 40-60 wt. % C.

18. The method of claim 1 wherein step (e) further comprises forming the pressure leach solution in an autoclave in the presence of ammonia and air, at a pressure and a temperature sufficient to produce leaching reactions and forming soluble complexes of Group VIB transition metals.

19. The method of claim 18 wherein step (e) wherein at least 70% of the Group VIB transition metals are leached into solution.

20. The method of claim 19 wherein the Group VIB transition metal is molybdenum and wherein at least 75 wt. % of said molybdenum is leached into solution in the form of ammonium molybdate.

21. The method of claim 18 wherein the pressure and the temperature within the autoclave respectively range between 120° C. to 250° C. and from 0 psig to 1200 psig.

22. The method of claim 21 wherein the pressure and the temperature within the autoclave respectively range between 135° C. to 225° C. and from 100 psig to 1000 psig.

23. The method of claim 21 or claim 22 further comprising a leaching time between 60 minutes to 360 minutes.

24. The method of claim 1 wherein step (e) further comprises passing the pressure leach slurry to a liquid solids separation step selected from the group consisting of settling, centrifugation, decantation and filtration to form a pressure leach residue comprising ash and insoluble organic matter and a pressure leach filtrate comprising Group VIB metal complexes and ammonium sulfate.

25. The method of claim 24 wherein the liquid solids separation step comprises filtration by a method selected from the group consisting of vertical centrifugation, vacuum filter, plate and frame filter and pressure belt filter.

26. The method of claim 24 wherein the pressure leach filtrate is passed to an acid precipitation step wherein a strong mineral acid is added to the pressure leach filtrate to achieve a preselected pH to effect precipitation of at least 90% of the Group VIB metals to form a Group VIB metal slurry.

27. The method of claim 26 wherein the preselected pH is 3.5 to effect precipitation of at least 90% of a molybdenum complex contained in said pressure leach filtrate.

28. The method of claim 26 wherein the Group VIB metal precipitated is tungsten and the preselected pH ranges from 1.0 to about 2.0 to effect precipitation of at least 95% of the soluble tungsten complexes.

29. The method of claim 26 wherein the strong mineral acid is selected from the group consisting of sulfuric acid, hydrochloric acid, phosphoric acid and nitric acid.

30. The method of claim 26 wherein the Group VIB metal slurry is passed to a solid liquid separation step selected from the group consisting of settling, filtration, decantation, centrifugation, and combinations thereof to form a Group VIB metals precipitate and an ammonium sulfate filtrate.

31. A method of claim 30 wherein the Group VIB metals precipitate comprises 50 to 80 wt. % molybdenum, not more than one wt. % vanadium, less than 20 wt. % ammonium sulfate and 1 to 10 wt. % sulfur.

32. The method of claim 30 wherein the ammonium sulfate filtrate is substantially free of Group VIB metal complexes.

33. The method of claim 30 wherein the ammonium sulfate filtrate comprises from 0.1 to 3% of the Group VIB metals contained in the metals bearing materials.

* * * * *